Aug. 22, 1967    H. J. BARKER ET AL    3,337,212
WORK GUIDANCE MECHANISMS

Filed July 29, 1965    6 Sheets-Sheet 1

Inventors
Harlow J. Barker
William L. Nickerson
Paul G. Rumball
By their Attorney
George C. Fuller

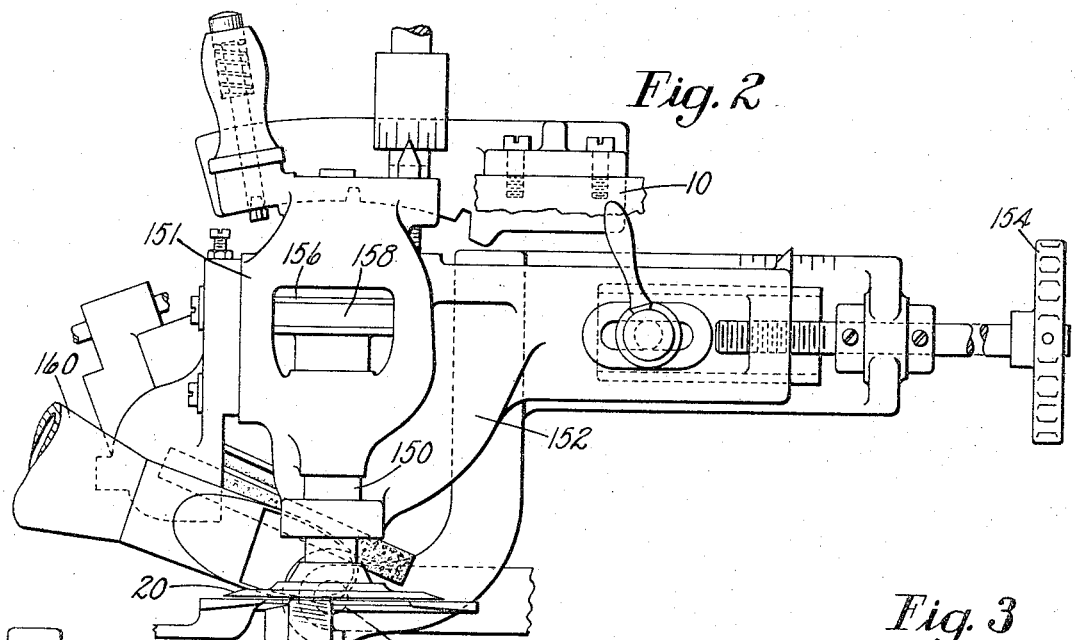
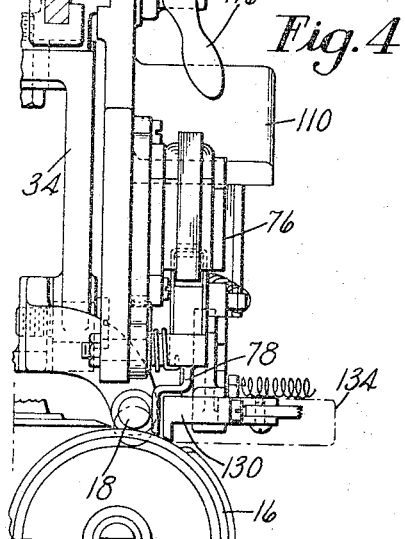
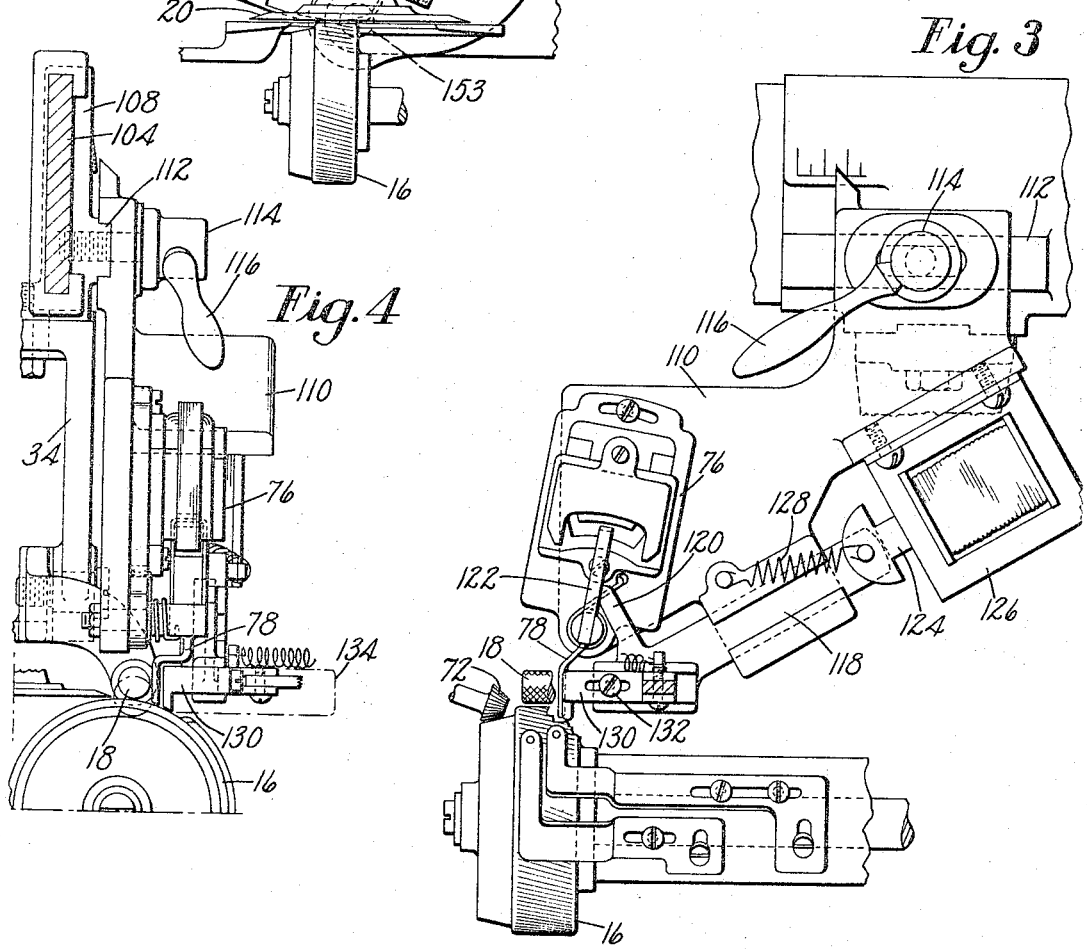

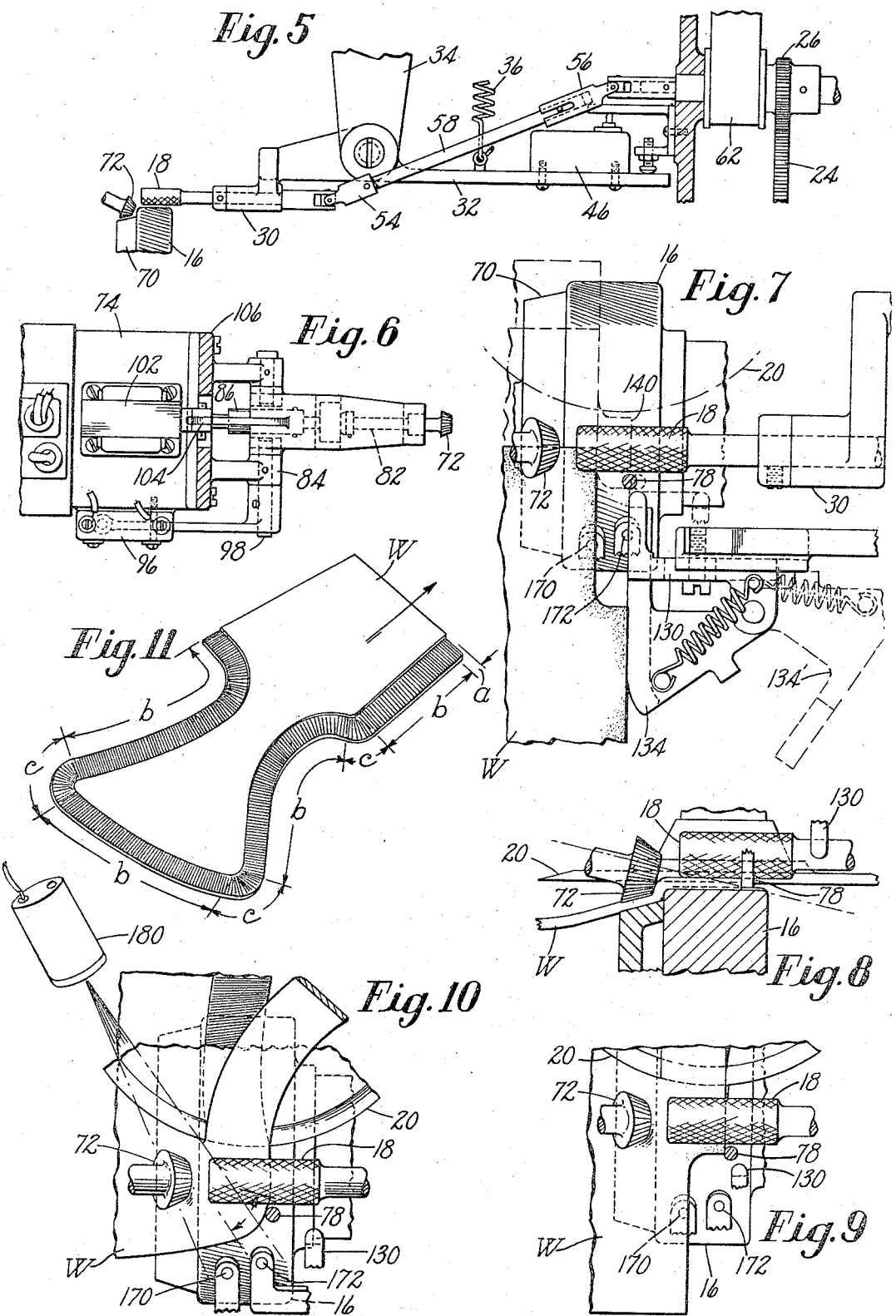

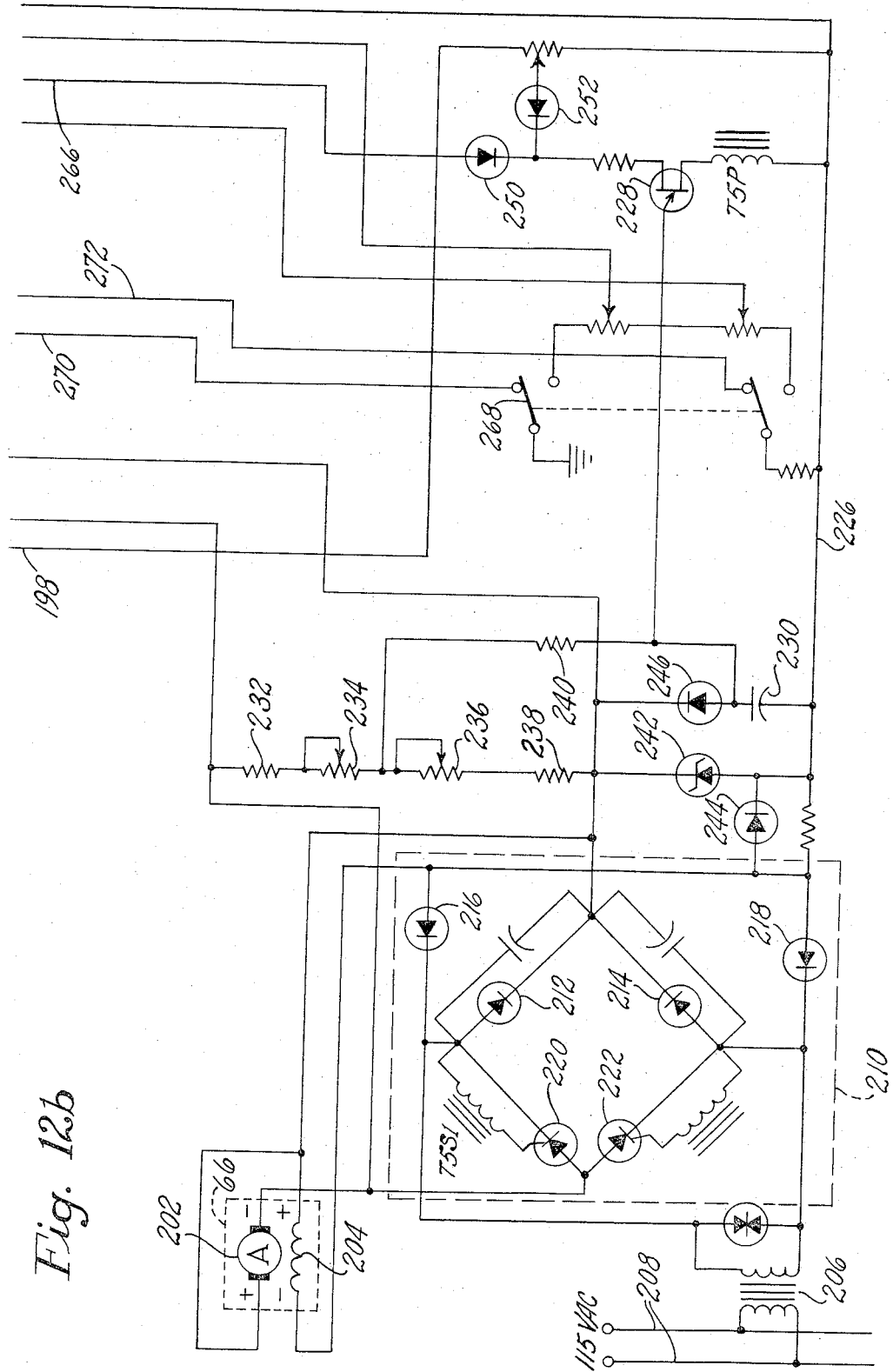

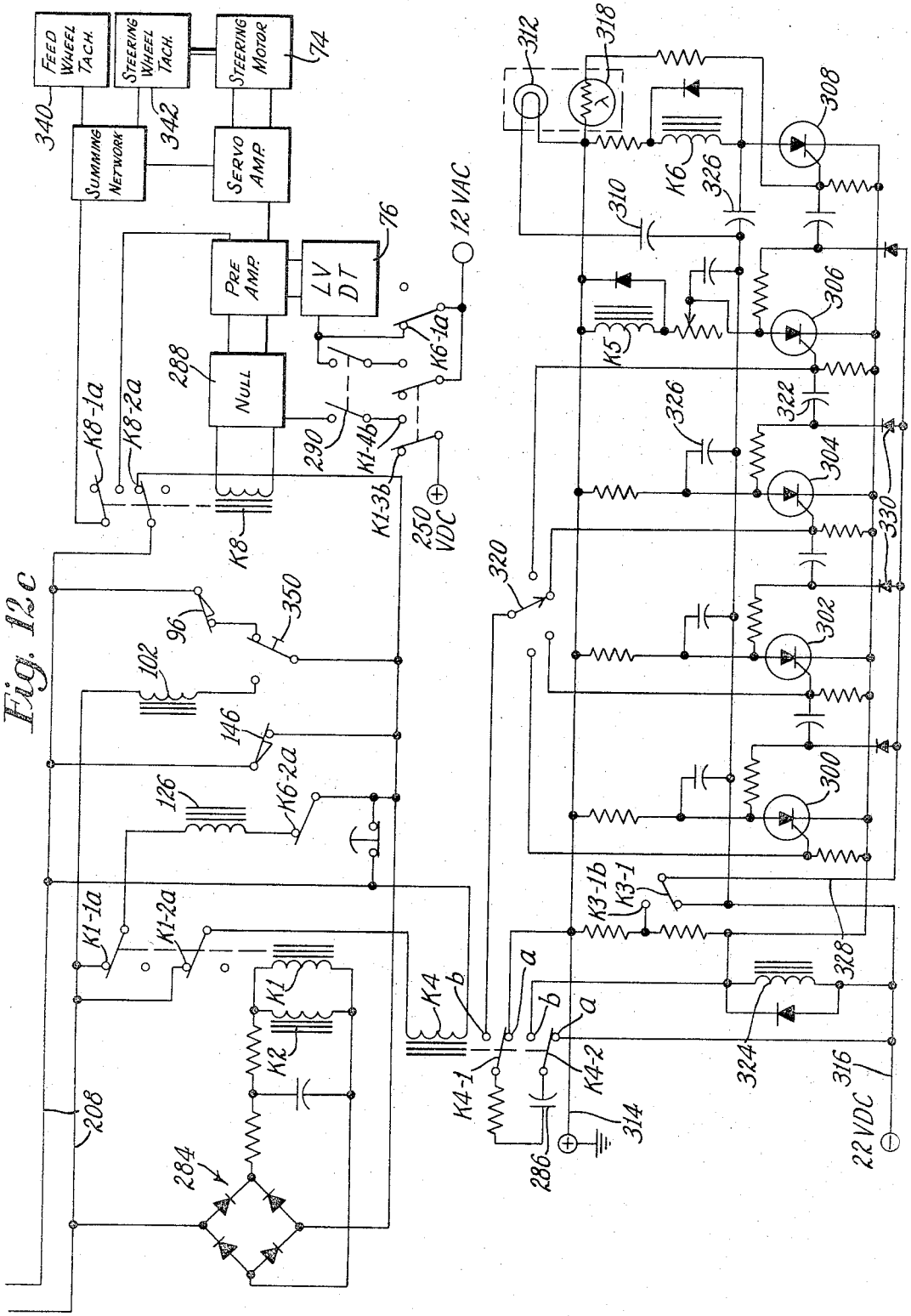

United States Patent Office 3,337,212
Patented Aug. 22, 1967

3,337,212
WORK GUIDANCE MECHANISMS
Harlow J. Barker, Wellesley, William L. Nickerson, Essex, and Paul G. Rumball, Beverly, Mass., assignors to United Shoe Machinery Corporation, Flemington, N.J., a corporation of New Jersey
Filed July 29, 1965, Ser. No. 475,647
10 Claims. (Cl. 271—1)

This invention relates to mechanism for feeding and guiding generally flat work pieces of irregular shape, particularly with respect to a tool for operating thereon. The invention is illustrated as embodied in a machine adapted to skive upper leather. A machine of this type is shown and described in U.S. Letters Patent No. 3,034,-781, issued May 15, 1962, on an application in the names of William S. Touchman and Lloyd A. Barnes.

The machine disclosed in the above recited patent has inner feeding members comprising a feed roll and a feed wheel cooperating to grip a work piece therebetween in a feed path and to feed said path toward a work station adjacent such feeding members at a speed which is manually controllable but which is in practice constant for a given work piece during operation thereon. Cooperating with the feeding members for steering, i.e., angular adjustment of the feed path relative to the feeding members, is a pair of outer steering members adapted to grip the work at a location lateral of the feed path of the work and arranged to be driven through servo means controlled by a curvature sensing element engageable with the periphery of the work piece adjacent the feeding members for steering the work piece during feeding to provide guidance (steered feeding) to maintain the desired passage of the feed path thereon through the feeding members. Thus, the guiding, as well as steering, elements comprise the feeding and steering members and the sensing element. Since the work station where the work piece engages a rotary skiving disc is close behind the feeding members, the work path closely approximates the feed path in contour.

The machine is also provided with a corner counting circuit operative in response to intermittent illumination of a solar cell, disposed ahead of the feeding elements in a position to be covered by a work piece when a straight edge portion is aligned in the direction of feed with the zero error edge position and to be uncovered by an outside corner, for causing the servo steering system to effect ejection of the work piece after a selected number of corners have been traversed.

While the machine of the foregoing patent has operated satisfactorily and produced skived work pieces of superior quality at a speed greater than had been possible with hand guided skiving machines, the speed capabilities of the machine had not been fully realized because of the necessity of limiting the speed to that at which the "worst case corner" could be negotiated by the servo steering mechanism. Furthermore, the range of pattern of work pieces which could be treated on the machine was limited, particularly in regard to the contour of the piece at the beginning and end of the work path. For example, to negotiate a work piece having a notch at the end of the work path which was not to be skived, it was necessary manually to close a switch to effect "caging" of the edge sensor to effect straight line runout.

Accordingly, it is a principal object of the present invention to improve the work handling capabilities of a machine of the type illustrated in the foregoing patent, particularly with respect to the speed of operation and its ability to handle a wide range of work piece patterns completely automatically once they have been inserted in the machine.

To this end and in accordance with a feature of the invention, means is provided controlled by a photocell in response to illumination thereof in sensing a corner for automatically rapidly changing the speed of operation of the feeding elements from a higher to a lower speed for negotiating the corner and for restoring the higher speed after the corner has been negotiated. In the illustrative machine a control circuit for a shunt wound D.C. motor is arranged to reduce the supply current and effect dynamic braking in response to the sensing of the corner by the corner detector cell for effecting such rapid change of feed speed.

Work piece patterns which are difficult to treat by means of the machine of the patent include those in which there is a notch at the start or at the end of the work path to be operated upon. A notch at the start is used herein to designate an area of the work piece where a long, shallow piece has been cut out from the peripheral margin at the start of the work path and where the edge of the notch is not the inner edge of the feed path. A feature of the invention delays steering until the periphery of the work beyond the notch can engage the sensor finger. Accurate insertion of the work piece with such a notch is greatly facilitated by an extension edge gauge having a work engaging surface aligned in the direction of feed with the zero error edge position at the feeding members and disposed far enough ahead of the feeding members to engage the pheriphery beyond the notch. It has also been found that an edge gauge close ahead of the feeding members is useful in avoiding a large initial servo error but such a gauge, if permitted to remain in such operative disposition, will prevent the work piece from being rotated in negotiating inside curvatures. Accordingly, the invention provides an edge gauge arranged for movement into and out of such operative disposition and means connected for operation by the caging solenoid.

A notch at the end of the work path of the work piece where there is a marginal cutout not to be skived, requires the caging of the sensor finger prior to the instant at which the solar cell would be uncovered by the work piece in order to prevent the servo from guiding the work piece around the notch margin. In accordance with a further feature of the invention, the counting circuit is operative after a selective number of corners has been negotiated to shift control of the counting circuite to a second solar cell positioned to be uncovered by the work piece when the notch at the end clears the cell and for response to the illumination of this cell to effect ejection of the work piece.

Other features and advantages of the invention will best be understood from the following description taken together with the accompanying drawings in which:

FIG. 2 is an elevation of a portion of the apparatus shown in FIG. 1;

FIG. 3 is a fragmental front elevation on an enlarged scale of a portion of the apparatus shown in FIG. 1;

FIG. 4 is an end elevation of apparatus shown in FIG. 3 on the same scale;

FIG. 5 is a fragmental view of a portion of the apparatus shown in FIG. 1;

FIG. 6 is a section taken on line VI—VI of FIG. 1;

FIG. 7 is a plan view on an enlarged scale of a portion of the apparatus shown in FIG. 1 illustrating operation on a work piece having a notch at the start;

FIG. 8 is a fragmental front elevation of the apparatus shown in FIG. 7;

FIG. 9 is a fragmental view similar to FIG. 7 illustrating operation on a work piece having a notch at the end;

FIG. 10 is a fragmental view similar to FIG. 9 illustrating operation on a work piece at a corner thereof;

FIG. 11 is an angular view of an arbitrary work piece illustrating different types of marginal work path areas;

Figure 12A:
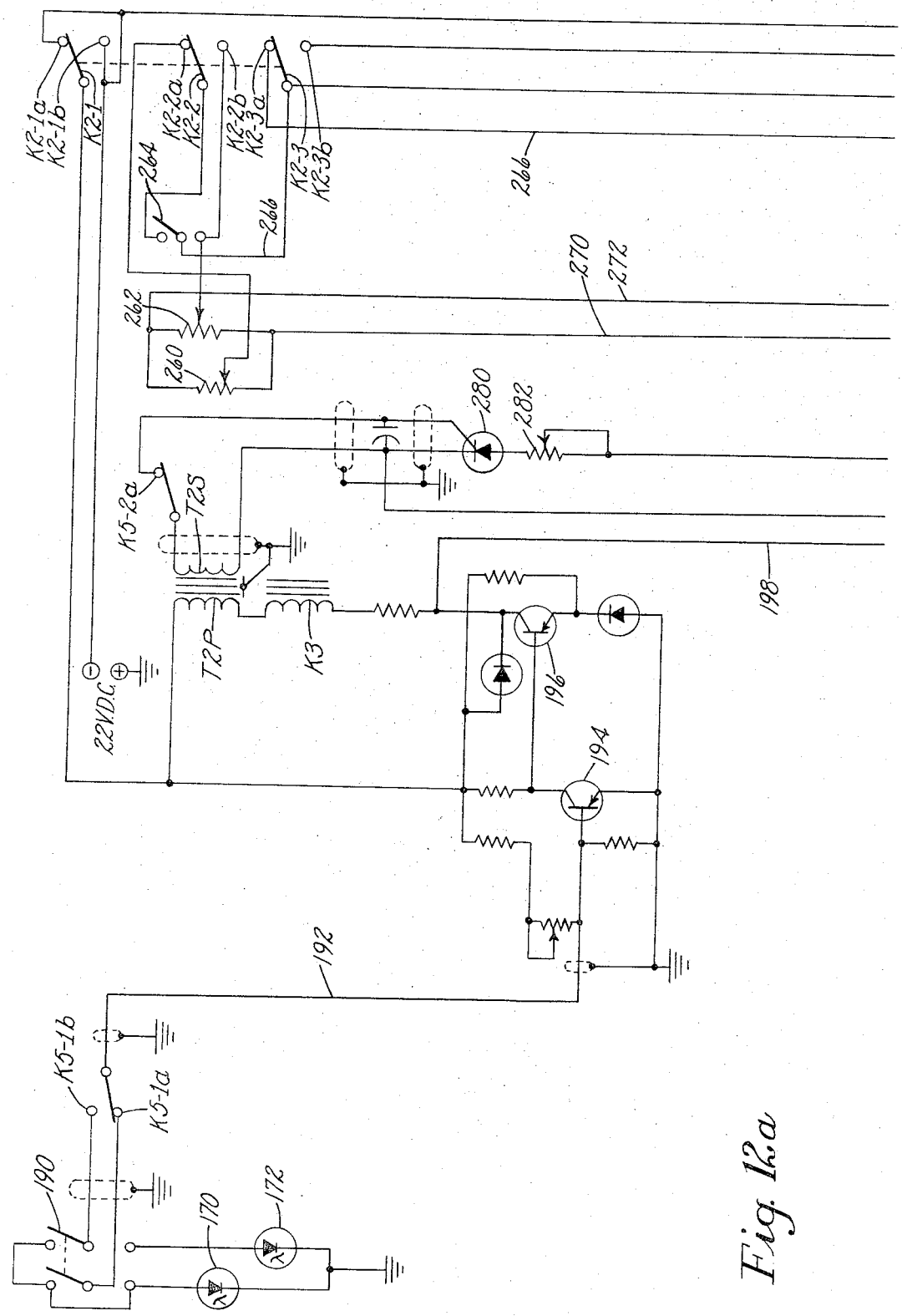

FIGS. 12a, 12b and 12c constitute a schematic of the electrical circuits of the feed motor control and the corner counting and ejecting circuits.

Figure 1:
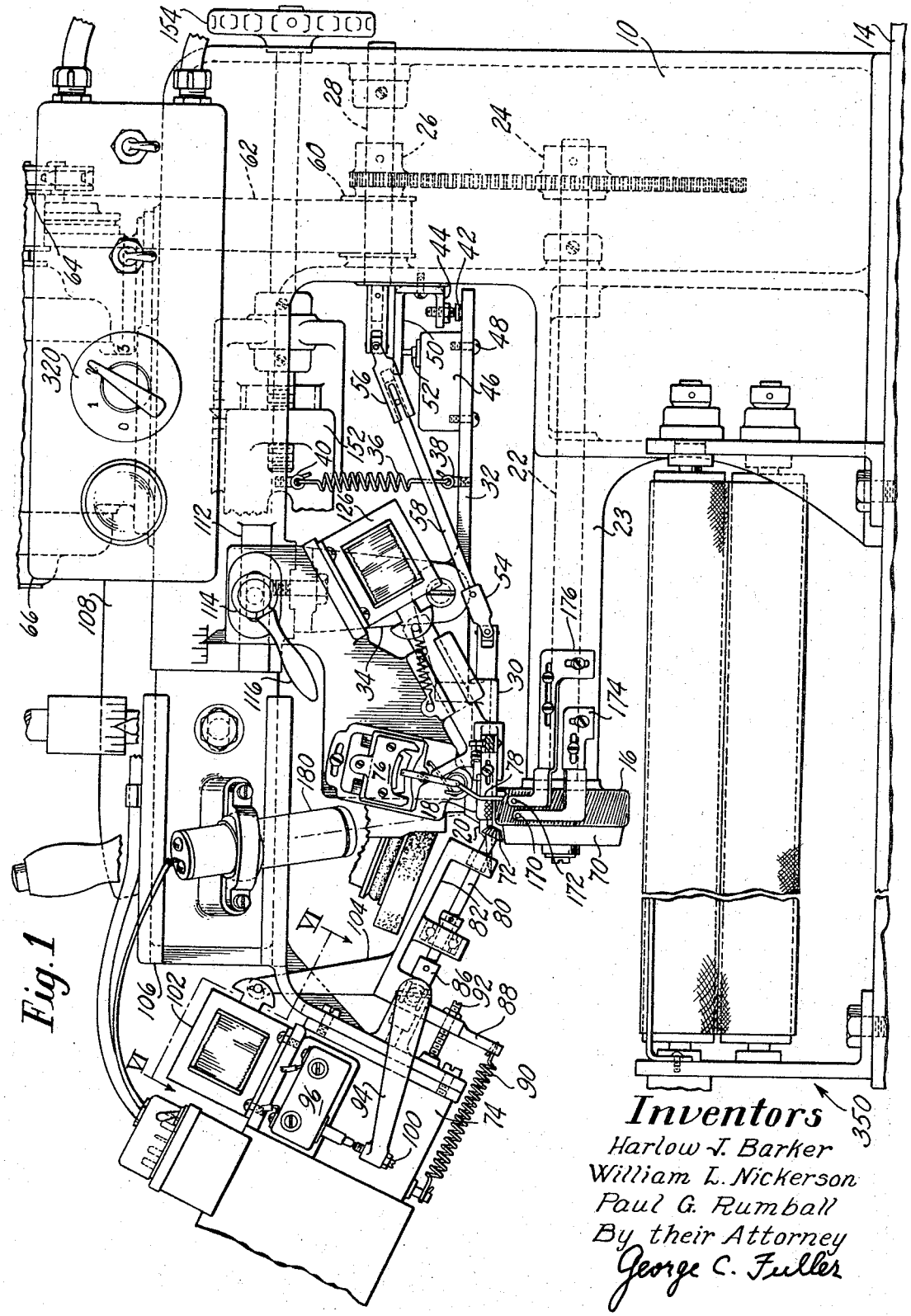
FIG. 1 is a front elevation of the machine embodying the present invention.

The illustrative machine is similar in many respects to that disclosed in the cited Patent No. 3,034,781. Thus it comprises a frame 10 carried on a bench 14 (FIG. 1). As in the organization disclosed in said patent, a work supporting rotary feed roll 16 and a rotary feed wheel 18 constitute a pair of feeding members for gripping and feeding a work piece away from the observer as viewed in FIG. 1 and toward a disc shaped skiving knife 20. The feed roll 16 is carried at one end of a shaft 22 extending through a lower arm 23 of the frame 10 and carrying at its other end a gear 24 which meshes with a pinion 26 on a jack shaft 28 also journaled in the frame. As best seen in FIG. 5, the feed wheel 18 has an integral axle portion mounted for rotation in a bearing 30 at one end of a rock arm 32 extending behind and pivoted to the bottom end of a bracket 34 (FIGS. 4 and 5) secured to the frame 10. The right end of the rock arm 32 as seen in FIGS. 1 and 5 is urged upwardly by a spring 36 connected between an eye 38 in the arm 32 and another eye 40 connected to the frame 10 so that its upper surface adjacent its outer tip normally engages a stop screw 42 threaded through a bracket 44. This position of the arm 32 may be so adjusted that with no work under it the feed wheel 18 substantially abuts the feed roll 16 and a plunger steering wheel switch 46 attached to the arm by screws 48 is pressed against a lug 50 of the bracket 44 with its plunger 52 depressed to close the switch contacts while a work piece under the wheel will open the contacts. The feed wheel 18 is connected to the jack shaft 28 through its axle portion, a pair of universal joints 54, 56 and a propeller shaft 58 telescopingly connecting the joints. The jack shaft 28 also carries a pulley 60 connected by a belt 62 to a pulley 64 of an electric motor 66. Thereby the electric motor is arranged to drive the feed wheel and feed roll at equal peripheral speeds because of the gear ratio of the gear 24 and the pinion 26.

The feed wheel 18 in the illustrative machine, formed as a knurled cylinder, is much wider than the corresponding feed wheel of the machine of the patent. The illustrative wide roll is suitable for use where the hardness of the surface of the work combined with the magnitude of the radius of curvature of the sharpest corner permit proper turning of the work piece during guidance. The wide wheel provides advantageously for the insertion of a work piece having a notch at the start (FIG. 7).

Where the work is very soft it may tend to bunch on corners if the wide roll is used. In such cases a narrow toothed roll as shown in the patent but with an independently suspended presser foot is preferred.

Cooperating with the feeding members for steering a work piece are a pair of steering members comprising a steering roll 70 and a beveled steering wheel 72 arranged to be driven by a servo motor 74 under the control of a linear variable differential transformer (LVDT) 76 in accordance with the position of a sensing finger 78 to provide steering of the work piece on the same basis as that disclosed in the above patent. Accordingly, only so much of the steering organization of the illustrative machine will be described as is deemed essential to the understanding of the present invention. Thus, referring to FIGS. 1 and 6, the steering wheel 72 is attached to a shaft 82 journaled in a bracket pivoted on a yoke 84 secured to the motor 74 to which the shaft 80 is connected by a universal joint 86.

A depending arm 88 of the bracket 82 is connected by a spring 90 to the motor 74 so that the bracket is urged clockwise, as shown in FIG. 1, to an extent limited by a stop screw 92 threaded through the arm 88 for bearing against the housing of the motor 74. An actuating arm 94 for a steering wheel switch 96 is fast to a shaft 98 journaled through the yoke 84 and fast to the bracket 82. A screw 100 threaded in a boss at the outer end of the arm 94 cooperates with a plunger of the switch 96 for actuating the switch to close its contacts by clockwise rotation of the bracket 82. The screws 92 and 100 are adjusted so that when no work is between the steering elements 70 and 72 the wheel 72 is disposed in a lower position with the switch 96 actuated, but when a work piece raises the wheel 72 rotation of the arm 94 releases the plunger far enough to effect switching action to open the contacts of the switch 96. A solenoid 102 carried on the housing of the motor 74 is connected through an arm 104 for swinging the bracket when the solenoid is energized to raise the wheel 72 clear of the roll 70. The motor 74 and its associated mechanism including the wheel 72 are carried on a bracket 106 slidably supported on a horizontal arm 108 of the main frame.

Secured to the arm 108 to the right of the bracket 106 as seen in FIGS. 1, 3 and 4 is a depending bracket 110 grooved to cooperate with a rail portion 112 of the arm 108 to which it is adjustably fastened by a screw clamp 114 having a handle 116. The bracket 110 carries the LVDT 76 and also means for "mechanically caging" it comprising a bar 118 slidably mounted on the bracket 110 and having an arm portion 120 engageable with a lever 122 attached to the core of the transformer. The bar 118 is connected to the armature 124 of a caging solenoid 126 which armature is urged leftward, as seen in FIG. 4, by a spring 128 so that when the solenoid is de-energized the arm portion 120 engages the lever to hold the sensing finger 78 in a position (hatched circle, FIG. 7) slightly outward (as defined in the patent) of a null position (shown as a dashed circle) in which the LVDT core is correspondingly disposed in its null position. Also attached to the bar 118 at its lower end is an edge gauge 130 adjustably attached thereto by a screw 132. An extension gauge 134 (FIG. 7) is pivotally carried at the lower end of the arm for swinging into and out of an operative position aligned with the operative position of the edge gauge 130 and has a spring 136 providing a slightly off-center pull between a point of attachment at the pivot of the gauge 134 and a pin 138 on the gauge to provide a snap action between an operative position, as shown in FIG. 7, and an inoperative position 134'. Both gauges have work engaging surfaces aligned in the direction of work feed with the zero error edge position at the feed members indicated in FIG. 7 by dashed line 140.

The skiving knife 20 as seen in FIG. 2 is mounted for rotation behind the roll 16, being fast to a shaft 150 which is journaled in bearings in a subframe 151 tiltable on a pivot 153. The subframe is carried on a slide 152 at the rear of the arm 108, the slide 152 having a screw connection with a hand wheel 154 for lateral adjustment of the skiving knife. A pulley 156 at the upper end of the shaft 150 is connected by a belt 158 to a motor (not shown) for effecting rotation of the knife. A nozzle 160 has an opening adjacent the knife 20 and is connected to a vacuum system for removing as it is cut from work pieces.

A corner sensing photocell 170 and a notch sensing photocell 172 are carried in adjustable brackets 174 and 176 respectively by the lower arm 23. The brackets are arcuate and partially shield the roll 16 and the arrangement is such that the cell 170 is precisely positioned ahead of and laterally relative to the sensing finger 78 at a location outside, i.e., to the left of, alignment in the direction of work feed with the predetermined zero error position of the edge of a work piece at the feeding members so as to define what curvature of the work piece constitutes an effective corner for control purposes. The cell 172 is dispositioned slightly ahead of the finger 78 inside the cell 170 and just outside the edge gauge 130 when the latter is in operative disposition (see FIG. 7). The terms "inside" and "outside" are used in a directional sense consistant with corresponding terms used in the patent. It will be seen from FIG. 8 that the notch photocell 172 is uncovered by a notch at the end of the work path which does not uncover the other photocell. Illumination for the photocell is provided by a lamp fixture 180 (FIG. 1) mounted on the bracket 106.

Referring now to the electrical diagrams, FIGS. 12a, 12b and 12c, the control circuits are divided roughly and respectively into an optical work sensing and control circuit, a speed control circuit for the electric motor 66 driving the feed members and switching and counting circuits for governing the functions of the machine. Thus, in FIG. 12a the photocells 170 and 172 are connected through a manual "notch at end" selector switch 190 to the contacts K5–2a and 2b of a relay in the counter circuit of FIG. 12c. Normally, the switch 190 is closed to the upper contacts whereby the signal through the K5–2 armature to an input lead 192 is always from the cell 170, but where a "notch at the end" situation obtains in a work piece, the switch 190 is manually closed to the bottom contacts so that when, after the corner prior to the notch has been traversed the K5–2b contacts are closed, the input is transferred to the notch cell 172. The input signal is applied through the input lead 192 to an amplifier circuit having a first transistor 194 and a second transistor 196 which are arranged so that in the absence of a signal from the photocell, that is, when the cell is covered, the transistor 194 is saturated and the transistor 196 is cut off. When a signal is received by the uncovering of a photocell, the transistor 194 is cut off by a positive voltage applied to its base and the transistor 196 is caused to conduct, its collector current passing through a relay K3 and the primary T2P of a transformer so that when, for example, a corner is sensed, the relay K3 is energized, a pulse of voltage appears across the secondary T2S and the voltage on a collector lead 198 swings positively from about −22 volts to about ground potential.

Referring now to FIG. 12b, the D.C. drive motor 66 for the feed members includes an armature 202 and a shunt field 204. A transformer 206 having its primary connected to A.C. leads 208 has a secondary supplying a double bridge circuit designated 210 which comprises six arms. Two of the arms comprising the diodes 212 and 214 are common to a bridge supplying the field 204, the other two arms being diodes 216 and 218 and to an armature supply bridge the other two arms of which comprise silicon controlled rectifiers (SCR's) 220 and 222. The SCR's 220 and 222 have gates and cathodes between which are connected respectively the secondaries T5S1 and T5S2 of a transformer. Accordingly, when the bridge 210 is supplied with alternating current from the transformer 206, the field 204 is provided with D.C. having a full wave ripple wave-form while the supply of current to the armature depends upon conduction by the SCR's 220 and 222 in response to gating pulses from the T5 secondaries. The primary T5P of the corresponding transformer is connected between a negative bus 226 and a unijunction transistor 228 connected in a relaxation oscillator circuit comprising a capacitor 230 connected between the bus 226 and the emitter of the transistor 228. A voltage divider across the armature 202 comprises, in series connection, two fixed resistors 232 and 238 and two variable resistors 234 and 236. A charging circuit for the capacitor 230 extends from the junction of resistors 234 and 236 through a resistor 240. A Zener diode 242 relates the potential of the positive terminal of the bridge to that of the bus 226 so that the charging current through the resistor 240 depends upon the armature voltage. During oscillation the capacitor 230 repetitively charges to a critical voltage which is a fixed proportion of the difference of the voltages of base-1 and base-2 of the transistor 228 at which voltage the latter conducts to terminate the charging periods and discharge the capacitor. The beginning of the charging period is tied to the beginning of an A.C. cycle by providing for the discharge of the capacitor 130 through diodes 244 and 246 at voltage valleys of the field bridge ripple. Each discharge of the capacitor 130 through the transistor 228 results in a pulse on the gates of the controlled rectifiers 220 and 222 on a rectifier after its anode has started to go positive in the A.C. cycle results in conduction by that rectifier for the balance of that half cycle and, accordingly, the shorter the charging periods, the earlier in their forward portions of the A.C. cycle the SCR's will be fired and the more current they will supply to the armature 202. The feedback provided by picking off charging voltage from the armature voltage divider provides for quickly establishing and maintaining a motor speed corresponding to a given base-2 voltage which, it will be seen, also controls the charging period.

The base-2 voltage for the transistor 228 is supplied from either a diode 250 or a diode 252 depending on which one has the higher anode voltage. When the transistor 196 is not conducting, the voltage on the lead 198 is close to that of the bus 226 and the base-2 voltage is received through the diode 250. The voltage for supplying this diode is picked, when a switch 268 (FIG. 12c) is in its illustrated position, from one of two potentiometers 260 and 262 (FIG. 12a) connected in parallel and, by leads 270 and 272, between the bus 226 and ground. The switch 268 is merely for the convenience of a technician in adjusting the machine; in the other position of the switch the control voltages are provided for adjustment at a more accessible location. A relatively low voltage corresponding to the fast, or normal straightaway, motor speed is taken from the potentiometer 260 while a higher voltage corresponding to a slow, or feed-in, speed is taken from the potentiometer 262. These voltages are supplied to contacts K2–2a and K2–2b so that when a selector switch 264 is closed to its upper contacts and K2 is not energized the armature K2–2 connects the high speed voltage through a lead 266 to the diode 250 and when K2 is energized the slow speed voltage is provided.

The voltage on the lead 198 resulting from conduction by the transistor 196 during exposure of the photocell 170 while a corner of a work piece is being negotiated provides an anode voltage for the diode 252 which corresponds to an intermediate speed. This voltage is more positive than the high speed voltage and hence is controlling during normal operation. At the beginning of the conduction by the transistor 196, the current through T2P causes a pulse from T2S to turn on a silicon controlled rectifier 280 (FIG. 12a) connected across the armature 202 in series with a resistor 282. Armature energy is then dissipated in the resistor until the back EMF falls sufficiently for the transistor 280 to be turned off by a commutation process and the motor proceeds to operate at the corner speed until the photocell 170 is again covered.

Referring now to FIG. 12c, the operation of a starting relay K1 and a speed control relay K2 is indicated. These two relays are connected in parallel for energization from a bridge 284 which is connected for energization from the A.C. leads 208 by any one of the feed wheel switch 46, steering wheel switch 96 or through K8–2a contact. The relay K8 is controlled by a null detector 288 so that K8 is energized either when the null detector 288 is disconnected from a source of 250 v. D.C. (by the opening of K1–4B or one arm of a "notch at the start" switch 290) or when the detector is connected to the 250 volt supply but is receiving no signal from the detector 76. In other words, K8 is de-energized in normal operation only when the detector 288 is receiving 250 volts and also an error signal from the LVDT.

Energization of K1 opens contact K1–1a de-energizing the caging solenoid 126 to effect caging and opens contact K1–2a de-energizing a relay K4 whose armatures K4–1 and K4–2 then connect a capacitor 286 in a charging circuit through their "a" contacts.

A five stage counting and sequencing circuit, controlled by the photocells 170, 172, comprises five SCR's 300, 302, 304, 306 and 308 connected so that each stage may be fired in turn by pulses, turning off a preceding stage.

In operation, when the control circuits are turned on for the first time for ordinary work without notches, no stage of the sequencing circuit is conducting. However, a capacitor 310 and a bulb 312 across the power leads 314 and 316 cause charging current of the capacitor to flash the bulb 312 momentarily reducing the resistance of a photo-resistor 318 to provide a positive pulse to the gate of SCR 308 which is thereby turned on energizing K6. The LVDT is electrically caged by the opening of K6–1a.

Since there is no work lifting the feed and steering wheels, the switches 46 and 96 are closed energizing the bridge 284 and relays K1 and K2. K1–1a and K1–2a are open interrupting the energizing circuit of a V relay K4 and the solenoid 126 so that the LVDT is mechanically caged. The K4–1a and K4–2a contacts are closed charging the capacitor 286. In the absence of an error signal from the LVDT sensor, the combined signals of a bias tachometer 340 (FIG. 12c) driven in accordance with the feed wheel and a servo tachometer 342 driven in accordance with the steering wheel cause the servo motor to drive the steering members at the same speed as the feeding members.

Assume that it is desired to skive a work piece around one corner and then eject it. A selector switch 320 is set at its one corner position as illustrated. K2 is energized, calling for "enter" speed (a, FIG. 11). When the work piece is inserted, the switches 46 and 96 are opened, and, since sensing relay K8 is energized opening contacts K8–2a, K1 and K2 are de-energized calling for high speed (b, FIG. 11). The contacts K1–2a energize relay K4 which through its "b" contacts discharges the capacitor 286 to the gate of the SCR 304 which then fires commutating the SCR 308 off and discharging the coupling capacitor 322 to the next stage. In all cases the turning off of a fired stage by the firing of another stage is provided by the inductive kick of an inductance 324 coupled through commutating capacitors 326 to the anode of the stage to be extinguished. Thus K6 is de-energized by the extinguishing of SCR 308 closing contacts K6–2a to energize the solenoid 126 mechanically uncaging the differential transformer by retracting the holding means for the sensing finger 78 and retracting the edge gauge and also through contacts K6–1a supplying excitation A.C. voltage to the primary of the transformer 76 thereby "electrically uncaging" the transformer. De-energization of the relay K2 upon entry of the work switches K2–2 armature to the high speed contact 2a and guidance begins. When a corner of a work piece uncovers the cell 170, the signal therefrom causes the transistor 196 to conduct sending a pulse from T2S to effect dynamic braking at the same time the control voltage on the lead 198 calls for the lower corner speed (c, FIG. 11). Conduction by the transistor 196 also energizes K3 closing the contact K3–1b in the counting and sequencing circuit to provide a positive pulse from K3–1 through a lead 328 to a series of diodes 330. Since the only coupling capacitor which is now substantially discharged is that coupling the third and fourth stages, the pulse is effective through this capacitor only, firing SCR 306 and turning off SCR 304 energizing K5. Since the brake signal is practically instantaneous and the action of K5 is deliberately delayed by the inclusion of enough resistance to make it sluggish, dynamic braking occurs before K5 can interrupt the brake trigger signal by opening K5–2a. On the next exposure of the cell to light at the end of the piece K5 will have operated and will prevent dynamic braking during ejection. When the end of the work piece exposes the cell 170, the transistor 196 sends a "corner speed" signal to the motor control, but the slow-down process is so slow without braking that the machine ejects the work piece at almost full running speed. The transistor 196 also energizes K3 firing the last stage and energizing K6 extinguishing previous stage and de-energizing K5. K6 now interrupts both the sensor excitation through K6–1a and the sensor caging solenoid current through K6–2a so that the sensor becomes both electrically and mechanically caged and the work piece is forced to run in a straight line out of the machine and onto a conveyor 350. The electrical caging prevents overshoot of the finger 78 on mechanical caging from producing an error signal and causing a steering twitch. At this time the switches 46 and 96 close. In order to slow the machine quickly after ejection so that it will revert to "enter" speed in time for the next work piece, a brake signal is provided by the brief interruption of the current through T2P by the transfer of the contacts K2 from K2–1a to K2–1b.

Any work piece whose leading edge is so cut away or deeply notched that one part touches the steering wheel during insertion before the right edge touches the feed wheel requires that the steering (servo) wheel be lifted out of the way until the right hand edge is under the feed roller and lifts its microswitch. Accordingly, a steering wheel solenoid switch 350 (FIG. 12c) is thrown to energize through the switch 46 the solenoid 102 which lifts the steering wheel. This renders the steering wheel switch 96 inoperative to cage and uncaging is accomplished by the feed wheel switch 46 alone. When the work piece enters the machine and operates this switch the steering wheel solenoid 102 is de-energized and the wheel drops onto the work piece at which point guidance begins.

Occasionally, in a condition shown in FIG. 7, there is a notch at the start of an edge to be skived which is so shallow that the leading edge contacts both the steering wheel and the feed wheel and where it is desired that the skived path be defined not by the edge of the notch but by the following edge of the work piece. For this condition the extension edge gauge 134 is attached to the edge gauge 130 and a work piece is aligned with the sensor finger 78 assisted by the gauge 134. The notch at the start switch 290 is closed which, since the finger 78 is caged slightly to the left of its null position indicated by the dashed circle in FIG. 7, energizes K8 opening the contacts K8–1a interrupting the steering signal to the servo amplifier. Therefore, in this situation it is a condition for the initiation of guidance that the work piece be introduced in operative disposition relative to the three guidance elements comprising the feed members, the steering members and the curvature sensing element. The material can then be inserted opening both switches 46 and 96 without initiating guidance until the edge of the work piece engages the finger 78 at the after end of the notch. At this point as the finger passes through its null position, the null sensor 288 energizes K8 closing K8–1b and opening K8–2a de-energizing K1 which removes the 250 volt supply from the detector 288 thereby holding K8 energized. The sensor 78 now receives its excitation through K6–1a.

When there is a notch in the edge of the leather at the end of the work piece, it is desired to cage the sensor for a straight run to ejection when a photocell senses the notch rather than to guide through the notch to the end of the work piece. This situation is illustrated in FIG. 8 and it will be seen therein that the photocell 170 is not located in a position adapted to sense the beginning of the notch. Accordingly, sensing is switched by the energization of K5 at the preceding corner to the photocell 172 which is more advantageously disposed to sense the notch. Operation of K5 on the last corner before ejection takes effect because of the built-in delay after the corner has been negotiated. Then the transfer of K5–1 to the 1b contacts connects the cell 172 to the import lead 192. When this cell is exposed by the leading edge of the notch, the last

Having thus described our invention what we claim as new and desire to secure by Letters Patent of the United States is:

1. In a machine for operating at a work station upon work pieces of sheet material along a predetermined work path thereon defined by curvature defining means, said machine having feeding means operative at a location adjacent said work station for gripping work pieces in marginal areas and feeding such areas toward the work station, sensing means responsive to said curvature defining means, variable speed drive means for operating the feed means and servo means controlled by said sensing means in accordance with said curvature defining means for shifting said work pieces to maintain passage of the work path through the work station, a corner detector operative at a location ahead of the operative location of the feeding means for sensing the uncovering of said location by said work piece at corners of predetermined acuity and a counting device controlled by said corner detector and operative in response to the sensing of a selected number of corners for effecting modification of the operation of the machine, in combination therewith, means controlled by said corner detector for changing the operating speed of said variable speed drive means from higher speed to a lower speed during the period that said corner detector senses the absence of material over the sensing location, and means controlled by said sensor for restoring the higher of said feed speeds upon cover of said sensor location by a work piece after traversing a corner.

2. Apparatus as in claim 1 and additionally comprising means controlled by said corner detector and operable in response to displacement of the work piece from covering relation with the operative location of the corner detector for effecting dynamic braking of the drive motor simultaneously with connecting it for operation at the lower of two operating speeds.

3. In a machine for feeding flat work pieces having curvature defining means to a work station, said machine having means operable at different speeds for gripping and feeding the work adjacent said station, sensing means responsive to said curvature defining means, servo means controlled by said sensing means and cooperative with said feeding means for guiding the work piece through the feeding means in accordance with said curvature defining means for moving a work path thereon through said station and counting and sequencing means controlled by photoresponsive means for causing the servo means to steer the work piece in a predetermined manner for ejection after a predetermined number of corners have passed the feeding means, in combination therewith, means controlled by said photoresponsive means in sensing a corner for changing the speed of operation of the feeding means.

4. In a machine for operating upon flat work pieces, said machine having:
 (a) feeding members adapted to grip a work piece in a predetermined marginal feed path the periphery of which is defined by predetermined pattern means moving with said work piece, said feeding members being operable to feed said work piece to transfer said path through said members,
 (b) steering members adapted to grip said work piece adjacent said feeding members and cooperable therewith to provide a turning movement for steering said work piece,
 (c) means for progressively sensing said predetermined pattern means at a sensing point corresponding to a feed path point ahead of said feeding members, and
 (d) servo means controlled by said sensing means in accordance with positional error of the sensing point for operating said steering members in relation to the operation of said feeding members to guide the feed path through the feeding members, in combination therewith,
 (e) an edge gauge having a surface adapted to engage the periphery of the work piece and movable between an inoperable position permitting free swinging of the work piece about the feeding members and an operative position with its gauging surface aligned in the direction of work feed with the zero error point of engagement of the periphery of the work piece with said feeding members, whereby the initial disposition of the work piece at feeding to avoid a large initial servo error is facilitated, and
 (f) means for moving said gauge from its operative to its inoperative position in response to the feed-in of said work piece in predetermined relation to the guiding and sensing means.

5. In a machine for operating upon flat work pieces, said machine having:
 (a) feeding members adapted to grip a work piece in a predetermined feed path defined by pattern means moving with said work piece, said feeding members being operable to feed said work piece to transfer said path through the feeding members,
 (b) steering members adapted to grip said work piece adjacent said feeding members and cooperate therewith to provide a turning movement for steering said work piece,
 (c) means for progressively sensing said predetermined pattern means at a sensing point corresponding to a feed path point ahead of said feeding members,
 (d) servo means controlled by said sensing means in accordance with an error signal therefrom corresponding to positional error of the sensing point for operating said steering members in relation to the operation of said feeding members to guide the feed path through the feeding members, said servo means providing straight line guidance in the absence of an error signal, and
 (e) means for caging the sensing means to prevent an error signal from reaching said servo means whereby upon such caging said feeding members and said steering members are driven at equal speeds to provide straight line feeding of a work piece, in combination therewith, means responsive to the gripping of a work piece by said feeding members and by said steering members upon insertion of said work piece for effecting uncaging of the sensing means for initiating guidance of the inserted work piece.

6. In a machine for operating upon flat work pieces, said machine having:
 (a) feeding members adapted to grip a work piece in a predetermined feed path defined by pattern means moving with said work piece, said feeding members being operable to feed said work piece to transfer said path through the feeding members,
 (b) steering members adapted to grip said work piece adjacent said feeding members and cooperate therewith to provide a turning moment for steering said work piece,
 (c) means for progressively sensing said predetermined pattern means at a sensing point corresponding to a feed path point ahead of said feeding members,
 (d) servo means controlled by said sensing means in accordance with an error signal therefrom corresponding to positional error of the sensing point for operating said steering members in relation to the operation of said feeding members to guide the feed path through the feeding members, and
 (e) means for caging the sensing means to prevent an error signal from reaching said servo means whereby upon such caging said feeding members and said steering members are driven at equal speeds to provide straight line feeding of a work piece, in combination therewith, means, responsive to the gripping of a work piece by said feeding members and said steering members simultaneously with the disposition of said pattern means relative to said sensing means for operational sensing in the null position of said sensor, for uncaging the sensing means and initiating guidance.

7. Apparatus as in claim 6 in which the sensing means comprises a sensing finger adapted to engage the periphery of a work piece and a differential transformer having a core controlled thereby, the caging means comprises means operable, in the situation of a "notch at the start," yieldingly to support said sensing finger adjacent its null position and for disconnecting the output of said transformer from the servo means to render the steering function inoperative while connecting said output to a detector responsive to a null output caused by movement of the sensing finger by an edge of a work piece for cooperating with said feeding and steering responsive means in effecting uncaging.

8. In a machine having feeding members and steering members operable for guiding a flexible work piece to move a predetermined feed path thereof through the feeding members, edge sensing means operative at a location ahead of the feeding members for controlling the operation of the steering members to maintain a predetermined position of the edge of the work piece at the feeding members, sensing means operative to sense the presence or absence of a work piece at a location ahead of said feeding members and outside of alignment in the direction of work feed with said predetermined edge position for sensing corners of predetermined acuity and counting and sequencing means controlled by said sensing means and operable to cause caging of the edge sensing means to effect ejection of said work piece after a predetermined number of corners have been sensed, in combination therewith, second sensing means operative to sense the presence or absence of a work piece at a location inside the sensing location of said first sensing means, and means controlled by said counting and sequencing means after one less than said selected number of corners has been sensed by said first sensing means for transferring the control of said counting and sequencing means from said first sensing means to said second sensing means whereby the sensing of a notch at the end of the feed path by said second means will effect caging and ejection.

9. Apparatus as in claim 8 in which the sensing means controlling the counting and sequencing control are photocells carried beneath the work path.

10. In a machine having feeding members and steering members operable for guiding a flexible work piece to move a predetermined feed path thereof through the feeding members, curvature sensing means responsive to curvature defining means carried by a work piece at a sensing point corresponding to a feed path point ahead of said feeding elements for controlling the operation of the steering members to maintain a predetermined position of the edge of the feed path at the feeding members, sensing means operative to sense the presence or absence of a work piece at a location ahead of said feeding members for sensing corners of predetermined acuity, and counting and sequencing means controlled by said sensing means and operable to cause caging of the curvature sensing means to effect ejection of said work piece after a predetermined number of corners have been sensed, in combination therewith, means controlled by ejection of the work piece from the feeding members and steering members for effecting the braking and slowing of the drive of said members from a higher speed to a lower speed whereby the next work piece may be promptly inserted at a suitable entry speed.

References Cited

UNITED STATES PATENTS 2,259,502    10/1941    Topham et al. _____ 271—1
3,034,781    5/1962    Touchman et al. _____ 271—1

M. HENSON WOOD, Jr., *Primary Examiner.*

A. N. KNOWLES, *Assistant Examiner.*